April 27, 1965 R. H. KREMER ETAL 3,180,714
PIPE JOINT
Filed April 11, 1962
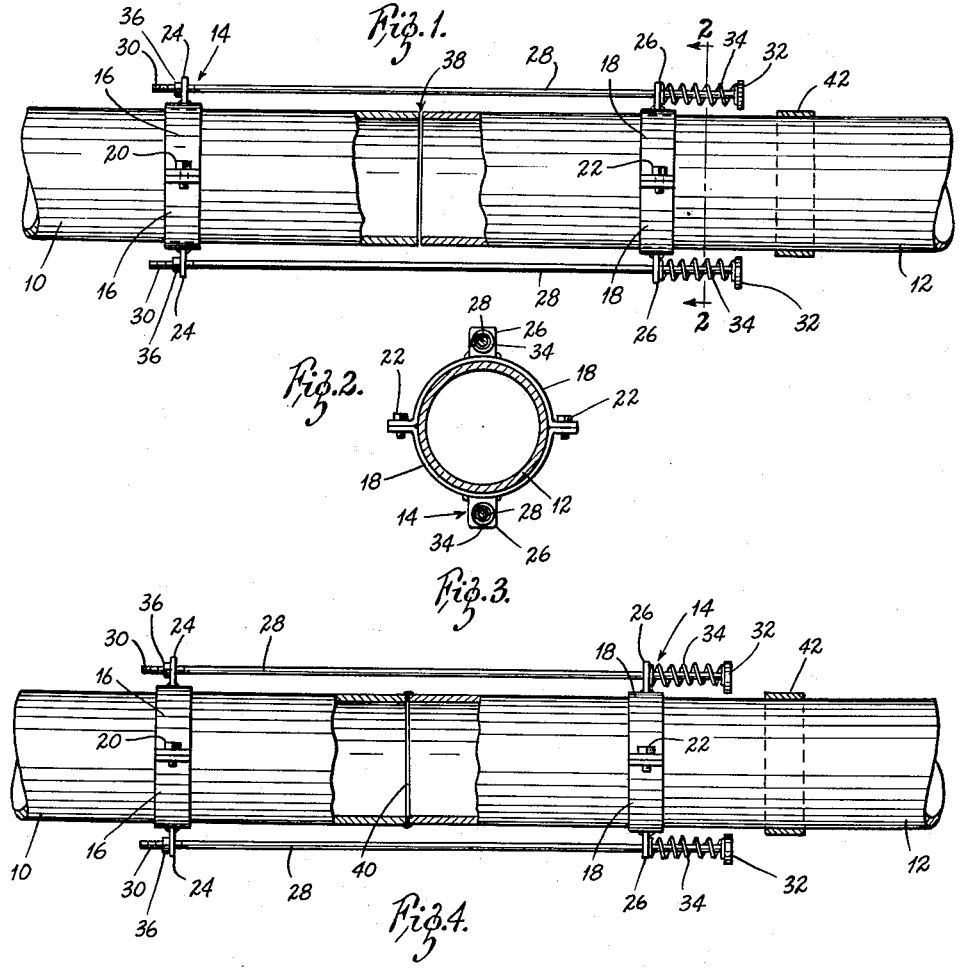
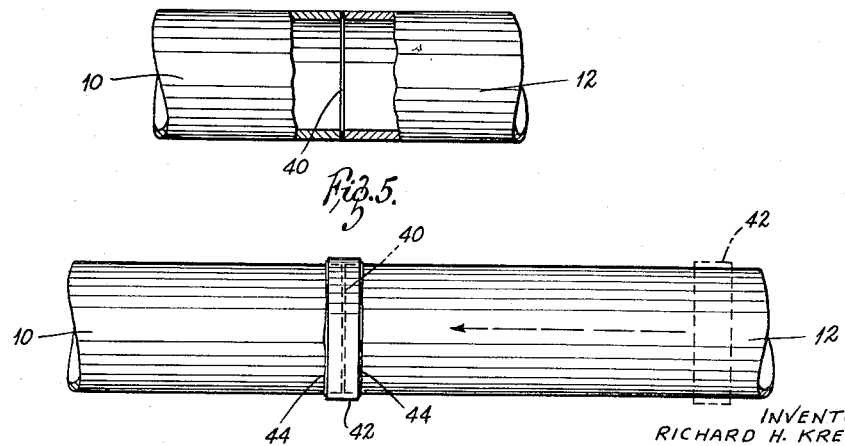
INVENTORS:
RICHARD H. KREMER,
JACOB W. HARBAUGH,
BY Kingsland, Rogers, Ezell & Robbins
ATTORNEYS 3,180,714
PIPE JOINT
Richard H. Kremer, Webster Groves, and Jacob W. Harbaugh, St. Louis County, Mo., assignors to Kremer-Hicks Company, St. Louis, Mo., a corporation of Missouri
Filed Apr. 11, 1962, Ser. No. 186,772
4 Claims. (Cl. 29—191.6)

The present invention relates generally to pipe joints, and more particularly to a novel pipe joint eliminating internal bacteria conducive areas and to a method of forming the same.

In the handling of beer and other liquid foods and beverages, the liquid product is moved through copper or stainless steel pipes or conduits. It is essential that the interior of such conduit be bacteria-free and otherwise in sanitary condition, so that the beer will not be contaminated. Heretofore, there has existed a serious problem, particularly in respect to bacteria formation at pipe joints. Efforts have been made to overcome the existing difficulties, but without practical success, considering initial cost, maintenance factors, and other facets of the problem.

Therefore, an object of the present invention is to provide a novel pipe joint and method of making the same which solves the existing problem.

In brief, the present novel method of forming a bacteria-proof joint for copper or stainless steel pipe segments includes the steps of butt-positioning two pipe or tube segments together and holding them in such relation under light pressure, silver soldering the joint at a temperature of around 1200° F., and sliding a coupling over the joint. The coupling is silver soldered to the tubing for additional tensile strength of the joint. The novel silver soldered joint is internally free of depressions within which bacteria can collect.

Hence, another object is to provide a novel joint for copper or stainless steel tubing which is internally formed to eliminate depressions, or the like, within which bacteria may form.

Another object is to provide a novel method of forming a bacteria-proof joint for copper or stainless steel pipe segments which permits observation of the work as the steps progress.

Another object is to provide a novel method of forming a bacteria-proof joint for copper or stainless steel tubes or pipes which is highly effective in the end result sought of a bacteria-proof joint, which is relatively inexpensive, and which effects a bacteria-proof joint which functions without the necessity of maintenance beyond that required for maintenance of the interior of the pipe.

The foregoing and other objects and advantages are apparent from the following description taken with the accompanying drawing, in which:

FIGURE 1 is a side elevational view of abutting copper or stainless steel pipe segments maintained in position by a clamping unit, portions being broken away and in cross section for clarity of illustration;

FIGURE 2 is a vertical, transverse cross-sectional view taken on substantially the line 2—2 of FIGURE 1;

FIGURE 3 is a view similar to FIGURE 1 showing the solder in the joint;

FIGURE 4 is a view of the joint of FIGURE 3 after the excess, external solder has been ground down to the outer diameter of the pipe segments; and FIGURE 5 is a side elevational view of the completed joint showing the coupling in position and soldered to the joined pipe segments.

Referring to the drawing more particularly by reference numerals, copper or stainless steel pipe segments 10 and 12 are shown in abutting relation, being maintained in this position by a spring clamp generally designated 14. The clamp 14 includes clamp halves 16 and 18 secured by bolts 20 and 22 to the pipe segments 10 and 12, respectively. Each clamp half 16 has a radial tab 24 secured thereto, and each clamp half 18 has a radial tab 26 secured thereto. A rod 28 having threads 30 at one end and a head 32 at the other end extends through each opposed pair of aligned tabs 24 and 26, a spring 34 being disposed between the head 32 and the tab 26, and a nut 36 being disposed on the threads 30 and against the tab 24. The adjustment of the nuts 36 is such as to maintain the springs 34 under light compression to keep the pipe segments 10 and 12 in abutting relation.

In FIGURE 1, the abutting ends of the pipe segments 10 and 12 are shown as slightly spaced at 38 in order to illustrate the invention more clearly. However, it is understood that the opposed ends of the pipe segments 10 and 12 are in normal abutting engagement, but this engagement of tube or pipe ends is not a sealed one, in effect, since normal cutting of such piping on the square will leave the end surfaces so that a space 38 actually exists when the tube segments 10 and 12 are in abutting relation, as shown. The segments 10 and 12 may be mechanically spaced, as by copper or stainless steel fragments, but this has not been found necessary.

With the pipe segments 10 and 12 maintained in the positions of FIGURE 1, silver solder at a temperature of substantially 1200° F. is applied around the full circumference of the abutment opening 38. The silver solder will pass through the opening 38 and will fuse with the copper, forming a very desirable joint. The solder solidifies on encountering the ambient temperature within the pipe segments 10 and 12 due to the characteristics of the material, forming an internal cavity-free area around the full circumference of the joint 40. No grinding or reaming is required. As is illustrated in FIGURE 3, a little excess silver solder will be disposed around the joint 40 externally, but it is a simple matter to remove this material by grinding or otherwise, to provide the configuration for the joint 40, as shown in FIGURE 4.

A coupling band 42, which may be split if desired for ready sliding, is disposed on the pipe segment 12, or the pipe segment 10 if desired, before the clamp 14 is applied. After the joint 40 is formed, the clamp 14 is removed. The band 42 is then moved into position around the joint 40 and silver soldered in position to provide protection for the joint 40 and additional tensile strength therefor, as indicated at 44.

The present joint is free of internal cavities, thereby eliminating areas within which bacteria can form. Hence, the joint is bacteria-free. The present novel method replaces heretofore employed capillary attraction methods of joint forming, and other methods.

It is apparent that there have been provided a novel joint for copper or stainless steel pipe segments and a novel method of forming the same, which fulfill the objects and advantages sought therefor.

It is to be understood that the foregoing description and the accompanying drawing have been given by way of illustration and example. It is also to be understood that changes in form of the several parts, substitution of equivalent elements or steps, and rearrangements of parts or steps, which will be readily apparent to one skilled in the art, are contemplated as within the scope of the present invention, which is limited only by the claims which follow.

What is claimed is:

1. A pipe joint for pipes used to conduct products which leave unwanted residues in any recesses on the inner surfaces of the pipes comprising two copper pipe segments in abutting relation, silver solder between said pipe segment ends connecting said segments together and sealing the juncture, said internal surface of said solder around the entire circumference of the joint being free of recesses as solidified due to uniform cooling effect of the air within the tube.

2. A pipe joint for pipes used to conduct products which leave unwanted residues in any recesses on the inner surfaces of the pipes comprising two copper pipe segments in abutting relation, silver solder between said pipe segment ends connecting said segments together and sealing the juncture, said internal surface of said solder around the entire circumference of the joint being free of recesses as solidified, and a coupling member disposed about said joint, said coupling member being firmly secured to said pipe segments.

3. A pipe joint for pipes used to conduct products which leave unwanted residues in any recesses on the inner surfaces of the pipes comprising two stainless steel pipe segments in abutting relation, silver solder between said pipe segment ends and extending to the inner surface of the pipe segments for connecting said segments together and sealing the juncture, said internal surface of said solder around the entire circumference of the joint being free of recesses as solidified due to uniform cooling effect of the air within the tube.

4. A pipe joint for pipes used to conduct products which leave unwanted residues in any recesses on the inner surfaces of the pipes comprising two stainless steel pipe segments in abutting relation, silver solder between said pipe segment ends connecting said segments together and sealing the juncture, said internal surface of said solder around the entire circumference of the joint being free of recesses as solidified, and a coupling member disposed about said joint, said coupling member being firmly secured to said pipe segments.

References Cited by the Examiner
UNITED STATES PATENTS

| | | | |
|---|---|---|---|
| 779,886 | 1/05 | Stewart | 29—484 |
| 1,939,467 | 12/33 | Short et al. | 29—484 |
| 2,417,967 | 3/47 | Booe | 29—191 |
| 2,612,581 | 9/52 | Robinson | 29—191 |
| 2,698,813 | 1/55 | Koh | 29—199 |
| 2,953,844 | 9/60 | Gelb et al. | 29—199 |

BENJAMIN HENKIN, *Primary Examiner.*

H. BIZOT, DAVID L. RECK, *Examiners.*